US010515350B2

(12) United States Patent
Kattimani et al.

(10) Patent No.: US 10,515,350 B2
(45) Date of Patent: Dec. 24, 2019

(54) METHOD AND APPARATUS TO TRIGGER MOBILE PAYMENT BASED ON DISTANCE

(71) Applicant: Samsung Electronics Co., Ltd, Suwon-si (KR)

(72) Inventors: Muralidhar Kattimani, San Jose, CA (US); Bulent Kasman, Mountain View, CA (US); Simon Gibbs, San Jose, CA (US); Jasvinder Singh, Santa Clara, CA (US); Anthony Liot, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 15/247,867

(22) Filed: Aug. 25, 2016

(65) Prior Publication Data

US 2017/0270510 A1 Sep. 21, 2017

Related U.S. Application Data

(60) Provisional application No. 62/308,502, filed on Mar. 15, 2016.

(51) Int. Cl.
*G06Q 20/20* (2012.01)
*G06Q 20/32* (2012.01)
*H04W 4/02* (2018.01)
*H04L 29/06* (2006.01)
*H04W 12/08* (2009.01)
(Continued)

(52) U.S. Cl.
CPC ......... *G06Q 20/3224* (2013.01); *G06Q 20/20* (2013.01); *G06Q 20/3278* (2013.01); *H04L 63/107* (2013.01); *H04W 4/023* (2013.01);

*H04W 12/08* (2013.01); *H04W 4/026* (2013.01); *H04W 4/80* (2018.02); *H04W 88/02* (2013.01)

(58) Field of Classification Search
CPC ....... G06Q 20/20; G06Q 20/32; G02B 6/0068
USPC ...................................... 705/17, 21
See application file for complete search history.

(56) References Cited

U.S. PATENT DOCUMENTS 8,489,067 B2 7/2013 Rackley, III et al.
8,750,901 B1 6/2014 Gupta et al.
(Continued)

FOREIGN PATENT DOCUMENTS

JP 2009146085 A 7/2009
KR 1020110013974 A 2/2011

OTHER PUBLICATIONS

European Patent Office, "Supplementary European Search Report," Application No. EP17766878.7, dated Nov. 28, 2018, 7 pages.
(Continued)

*Primary Examiner* — Oluseye Iwarere

(57) ABSTRACT

A method, mobile device, and non-transitory computer readable medium for transmitting information. The method includes determining, by a mobile device, a distance between the mobile device and another device in response to a request for the mobile device to transmit the information. The method also includes determining, by the mobile device, whether the distance between the mobile device and the other device is within a threshold distance. Additionally, the method includes transmitting, by the mobile device, the information to the other device after determining that the distance between the mobile device and the other device is within the threshold distance.

17 Claims, 4 Drawing Sheets

(51) Int. Cl.
*H04W 88/02* (2009.01)
*H04W 4/80* (2018.01)

(56) References Cited

U.S. PATENT DOCUMENTS

| | | | |
|---|---|---|---|
| 8,838,477 B2 | 9/2014 | Moshfeghi | |
| 8,903,093 B2 | 12/2014 | Kim et al. | |
| 8,977,567 B2 | 3/2015 | Aabye et al. | |
| 9,070,122 B1 | 6/2015 | Geller et al. | |
| 9,129,199 B2 | 9/2015 | Spodak et al. | |
| 9,503,860 B1* | 11/2016 | Mankovskii | H04W 4/023 |
| 9,710,772 B1* | 7/2017 | Kelly | G06Q 10/083 |
| 9,792,594 B1* | 10/2017 | Bayha | G06Q 20/1085 |
| 2009/0167699 A1 | 7/2009 | Rosenblatt et al. | |
| 2011/0238517 A1 | 9/2011 | Ramalingam et al. | |
| 2011/0320314 A1 | 12/2011 | Brown | |
| 2012/0116861 A1* | 5/2012 | Dobyns | G06Q 30/0234 705/14.34 |
| 2013/0171940 A1* | 7/2013 | Miki | H04B 7/26 455/41.2 |
| 2013/0268400 A1* | 10/2013 | Ballard | G06Q 30/0641 705/26.8 |
| 2014/0099886 A1* | 4/2014 | Monroe | G06F 3/0487 455/41.1 |
| 2014/0101056 A1 | 4/2014 | Wendling | |
| 2014/0138435 A1* | 5/2014 | Khalid | G06Q 20/227 235/380 |
| 2014/0139380 A1 | 5/2014 | Ouyang et al. | |
| 2014/0156534 A1 | 6/2014 | Quigley et al. | |
| 2014/0180777 A1* | 6/2014 | Moshrefi | G06Q 20/20 705/14.4 |
| 2014/0214547 A1* | 7/2014 | Signorelli | G06Q 30/0267 705/14.64 |
| 2014/0246490 A1 | 9/2014 | Graylin | |
| 2014/0249948 A1 | 9/2014 | Graylin et al. | |
| 2014/0279101 A1 | 9/2014 | Duplan et al. | |
| 2014/0300540 A1* | 10/2014 | Beadle | G07C 9/00007 345/156 |
| 2014/0304094 A1* | 10/2014 | Reddy | G02B 6/0073 705/17 |
| 2014/0337930 A1* | 11/2014 | Hoyos | H04L 63/10 726/4 |
| 2015/0019432 A1* | 1/2015 | Burns | G06Q 20/3278 705/44 |
| 2015/0042789 A1 | 2/2015 | Inwood et al. | |
| 2015/0080021 A1* | 3/2015 | Bietz | H04B 1/3877 455/456.1 |
| 2015/0138330 A1 | 5/2015 | Krishnamoorthi | |
| 2015/0141043 A1* | 5/2015 | Abramson | G01C 21/34 455/456.1 |
| 2015/0154634 A1 | 6/2015 | Chiu et al. | |
| 2015/0168174 A1* | 6/2015 | Abramson | G01C 21/3697 701/408 |
| 2015/0235290 A1 | 8/2015 | Boemi et al. | |
| 2015/0269582 A1 | 9/2015 | Simmons | |
| 2015/0278803 A1* | 10/2015 | Champaneria | G06Q 20/36 705/17 |
| 2015/0302385 A1 | 10/2015 | Boncyk et al. | |
| 2015/0348009 A1* | 12/2015 | Brown | G06Q 20/3227 705/16 |
| 2016/0071071 A1* | 3/2016 | Lazay | G06Q 20/10 705/39 |
| 2016/0088449 A1* | 3/2016 | Sharma | H04W 4/12 455/426.1 |
| 2016/0148270 A1* | 5/2016 | Vigier | G06Q 30/0267 705/14.58 |
| 2016/0203650 A1* | 7/2016 | Stanford | G07B 15/02 705/13 |
| 2016/0248975 A1* | 8/2016 | Choi | G03B 13/36 |
| 2016/0253656 A1* | 9/2016 | Dragushan | G06Q 20/3226 705/71 |
| 2016/0321649 A1* | 11/2016 | Dragushan | G06Q 20/342 |
| 2016/0321666 A1* | 11/2016 | Dragushan | G06K 9/00536 |
| 2016/0379200 A1* | 12/2016 | Phillips | G06Q 20/327 705/17 |
| 2017/0004485 A1* | 1/2017 | Lee | G06Q 20/327 |
| 2017/0032354 A1* | 2/2017 | Tilahun | G06Q 20/3223 |
| 2017/0055303 A1* | 2/2017 | Wang | H04W 8/22 |
| 2017/0148018 A1* | 5/2017 | Levin | G06Q 20/202 |
| 2017/0270510 A1* | 9/2017 | Kattimani | G06Q 20/3224 |

OTHER PUBLICATIONS

Notification of Transmittal of the International Search Report and the Written Opinion of the International Searching Authority, or the Declaration dated Apr. 18, 2017 in connection with International Patent Application No. PCT/KR2017/000308.
About Apple Pay in the U.S., https://support.apple.com/en-us/HT201469, Oct. 22, 2015, 6 pgs.
Looppay Support 10 Tips for Payment Success, http://support.looppay.com/supportisolutions/articles/l000147455-10-tips-for-payment-success, Dec. 23, 2015, 2 pgs.
LoopPay White Paper, Stronger Security and Mobile Payments-Dramatically Faster and Cheaper to Implement, George Wallner, Achieving Mobile Payment Security Minus the Upgrade Costs, www.looppay.com, 2014, 8 pgs.

* cited by examiner

METHOD AND APPARATUS TO TRIGGER MOBILE PAYMENT BASED ON DISTANCE

CROSS-REFERENCE TO RELATED APPLICATION AND CLAIM OF PRIORITY

This application claims priority under 35 U.S.C. § 119(e) to U.S. Provisional Patent Application No. 62/308,502 filed on Mar. 15, 2016. The above-identified provisional patent application is hereby incorporated by reference in its entirety.

TECHNICAL FIELD

This disclosure relates generally to authentication or other information transmission over a short range wireless transmission. More specifically, this disclosure relates to triggering information transmission based on distance.

BACKGROUND

Authentication over a short range wireless transmission is becoming commonplace in many aspects of mobile devices. One area includes mobile payment support, which is an increasingly expected feature for current smart phones (e.g., Apple Pay,™ Samsung Pay,™ Android Pay,™ etc.). The mobile payment support may utilize wireless transmission of payment information to a point of sale (POS) terminal. Such transmissions may prematurely activate and time out without the authentication being completed. Additionally, short range wireless transmissions often involve the transmission of important information that is desirably transmitted securely (e.g., such as credit card information).

SUMMARY

Embodiments of the present disclosure provide triggering information transmission based on distance.

In one embodiment, a method for transmitting information is provided. The method includes determining, by a mobile device, a distance between the mobile device and another device in response to a request for the mobile device to transmit the information. The method also includes determining, by the mobile device, whether the distance between the mobile device and the other device is within a threshold distance. Additionally, the method includes transmitting, by the mobile device, the information to the other device after determining that the distance between the mobile device and the other device is within the threshold distance.

In another embodiment, a mobile device for transmitting information is provided. The mobile device includes at least one processor and a transceiver operably connected to the at least one processor. The at least one processor is configured to determine a distance between the mobile device and another device in response to a request for the mobile device to transmit the information; and determine whether the distance between the mobile device and the other device is within a threshold distance. The transceiver is configured to transmit the information to the other device after determining that the distance between the mobile device and the other device is within the threshold distance.

In yet another embodiment, a non-transitory computer readable medium comprising program code is provided. The program code, when executed by at least one processor of a mobile device, causes the at least one processor to determine a distance between the mobile device and another device in response to a request for the mobile device to transmit the information, determine whether the distance between the mobile device and the other device is within a threshold distance, and instruct transmission of information to the other device after determining that the distance between the mobile device and the other device is within the threshold distance.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
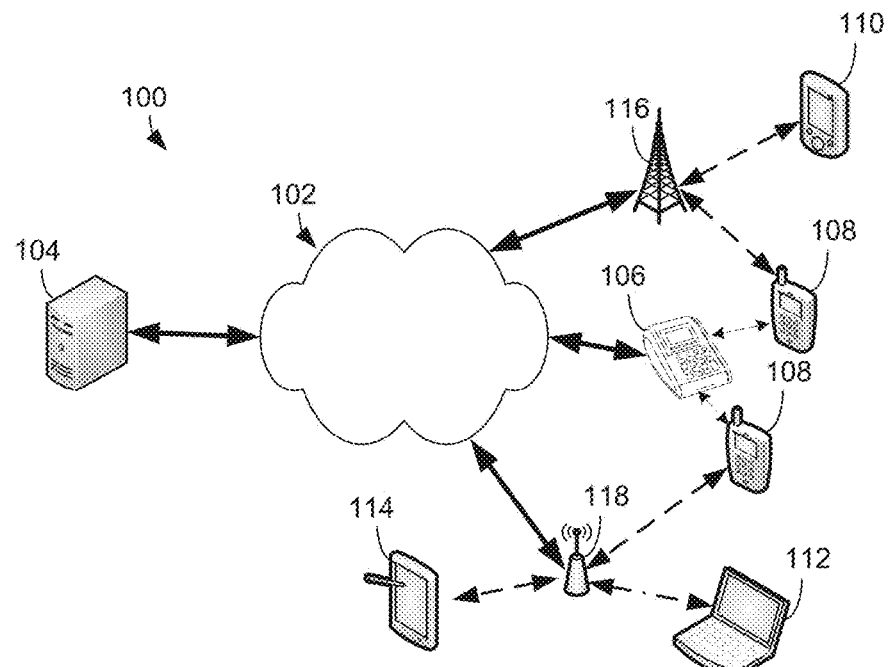
FIG. 1 illustrates an example communication system in accordance with embodiments of the present disclosure.

FIG. 1 illustrates an example communication system 100 in accordance with various embodiments of the present disclosure. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between various server(s) 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or communication device that interacts with at least one server or other computing device(s) over the network 102. In this example, the client devices 106-114 include electronic devices, such as, for example, a point of sale (POS) device 106, a mobile devices 108 (e.g., cell phones or smartphones), a personal digital assistant (PDA) 110, a laptop computer 112, a tablet computer 114, a wearable device, smart watch, etc. However, any other or additional client devices could be used in the communication system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points (APs) 118, such as IEEE 802.11 wireless APs, Bluetooth, and Wifi direct. Note that these are for illustration only and that each client device could communicate directly with the network 102 or indirectly with the network 102 via any suitable intermediate device(s) or network(s).

As described in more detail below, the mobile devices 108 transmit information over short distances securely and efficiently to another device, such as, for example, the POS device 106. The mobile devices 108 can track their location with respect to the POS device 106 and trigger the information transmission based on the distance from the POS device 106.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
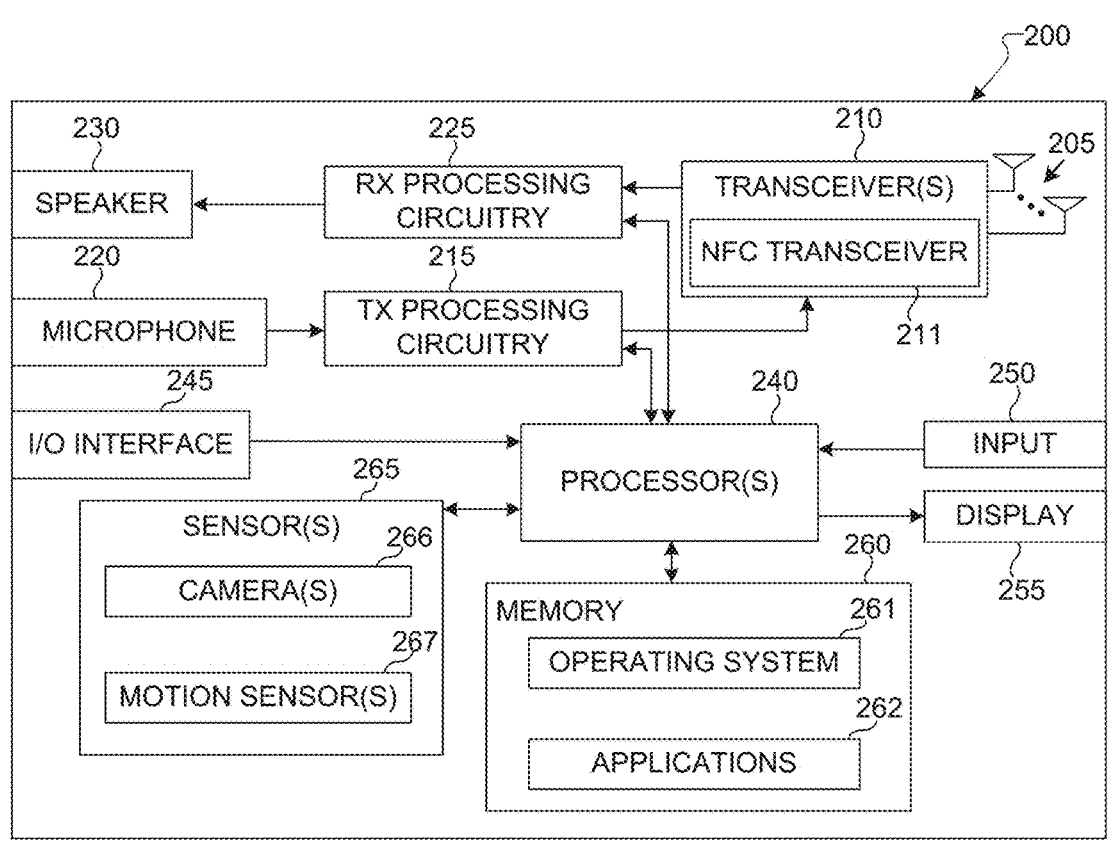
FIG. 2 illustrates an example mobile device according to various embodiments of the present disclosure.

FIG. 2 illustrates an example mobile device 200 according to various embodiments of the present disclosure. The embodiment of the mobile device 200 illustrated in FIG. 2 is for illustration only, and the client devices 108-114 of FIG. 1 could have the same or similar configuration. However, mobile devices come in a wide variety of configurations, and FIG. 2 does not limit the scope of this disclosure to any particular implementation of a mobile device.

As shown in FIG. 2, the mobile device 200 includes antenna(s) 205, transceiver(s) 210, TX processing circuitry 215, a microphone 220, and receive (RX) processing circuitry 225. The mobile device 200 also includes a speaker 230, processor(s) 240, input/output (I/O) interface 245, an input 250, a display 255, a memory 260, and sensor(s) 265. The memory 260 includes an operating system (OS) 261 and one or more applications 262.

The transceiver(s) 210 receive, from the antenna(s) 205, an incoming RF signal transmitted by an access point (e.g., base station, WiFi router, Bluetooth device) for a network (e.g., a WiFi, Bluetooth, cellular, 5G, LTE, LTE-A, WiMAX, or any other type of wireless network). The transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

In this embodiment, the mobile device 200 further includes a near field communication (NFC) transceiver 211 for transmitting and receiving information over short distances. The NFC transceiver 211 may transmit and receive the information using NFC protocols including use of electromagnetic induction and reading information from active or passive radio-frequency identification (RFID) tags. The NFC transceiver 211 may also transmit and receive information using magnetic secure transmission (MST) protocols by emitting a magnetic signal that mimics the magnetic strip on a traditional payment card to send payment information (e.g., credit card number, credit card identifiers, date, user identifiers, address information, bank account information, etc.).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The transceiver 210 receives the outgoing processed baseband or IF signal from the TX processing circuitry 215 and up-converts the baseband or IF signal to an RF signal that is transmitted via the antenna(s) 205. In some embodiments, the transceiver 210, the TX processing circuitry 215, and the RX processing circuitry 225 may be implemented within the same block or chip, such as a WiFi and/or Bluetooth module and/or chip.

The processor 240 can include one or more processors and execute the OS program 261 stored in the memory 260 in order to control the overall operation of the mobile device 200. In some embodiments, the processor 240 includes at least one microprocessor or microcontroller. In some embodiments, the processor 240 is configured to execute a plurality of applications 262, such as a payment application for initiating an electronic payment. The processor 240 can operate the plurality of applications 262 based on the OS program 261.

The processor 240 is also coupled to the I/O interface 245, which provides mobile device 200 with the ability to connect to other devices such as laptop computers and handheld computers. The processor 240 is also coupled to the input 250 (e.g., keypad, touchscreen, button etc.) and the display 255. The operator of the mobile device 200 can use the input 250 to enter data into the mobile device 200. The display 255 can be a liquid crystal display, a light-emitting diode (LED) display, an optical LED (OLED), an active matrix OLED (AMOLED), or other display capable of rendering text and/or at least limited graphics, such as from web sites.

The memory 260 is coupled to the processor 240. Part of the memory 260 could include a random access memory (RAM), and another part of the memory 260 could include a Flash memory or other read-only memory (ROM).

Mobile device 200 further includes one or more sensor(s) 265 that can meter a physical quantity or detect a position of the mobile device 200, and convert metered or detected information into an electrical signal. For example, sensor 265 may include one or more camera(s) 266 and one or more motion sensor(s) 267 (e.g., a gesture sensor, a gyroscope or gyro sensor, a magnetic field sensor or magnetometer, an acceleration sensor or accelerometer), as well as an air pressure sensor, a grip sensor, a proximity sensor, a color sensor (e.g., a Red Green Blue (RGB) sensor), a temperature/humidity sensor, an illumination sensor, etc. The sensor(s) 265 can further include a control circuit for controlling at least one of the sensors included therein. As will be discussed in greater detail below, one or more of these sensor(s) 265 are used to determine a position of the mobile device 200 relative to its environment and with respect to another device for distance based information transmission.

Although FIG. 2 illustrates an example of mobile device in a communication system, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the mobile device 200 configured as a mobile telephone or smartphone, the mobile devices could be configured to operate as other types of mobile devices. In addition, as with computing and communication networks, client devices and servers can come in a wide variety of configurations and FIG. 2 does not limit this disclosure to any particular mobile devices.

Figure 3A:
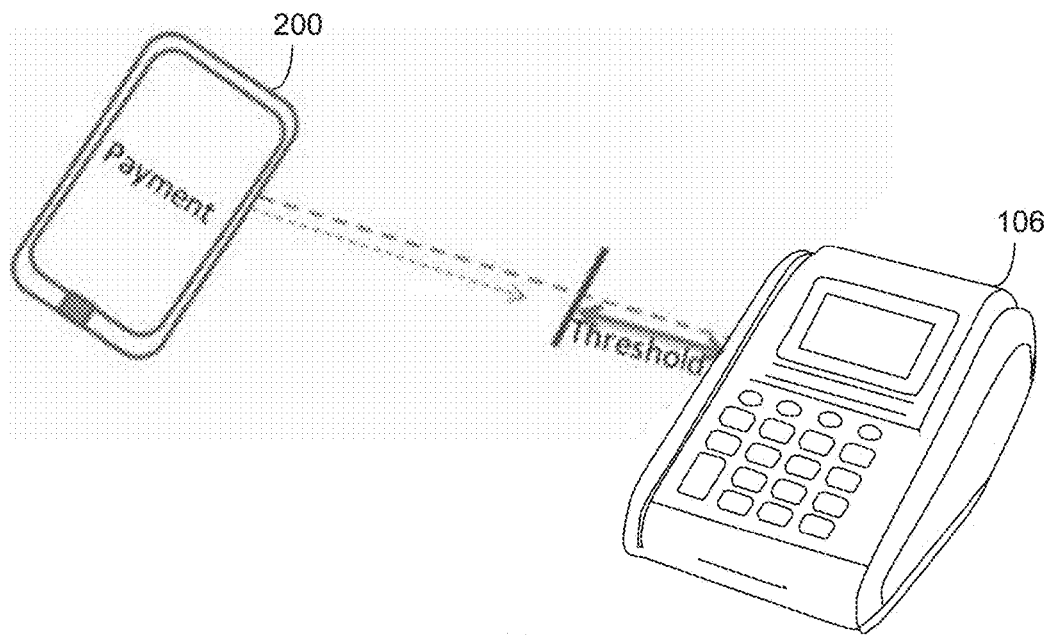
FIGS. 3A and 3B illustrate an example of information transmission based on distance between devices according to various embodiments of the present disclosure.
Figure 3B:
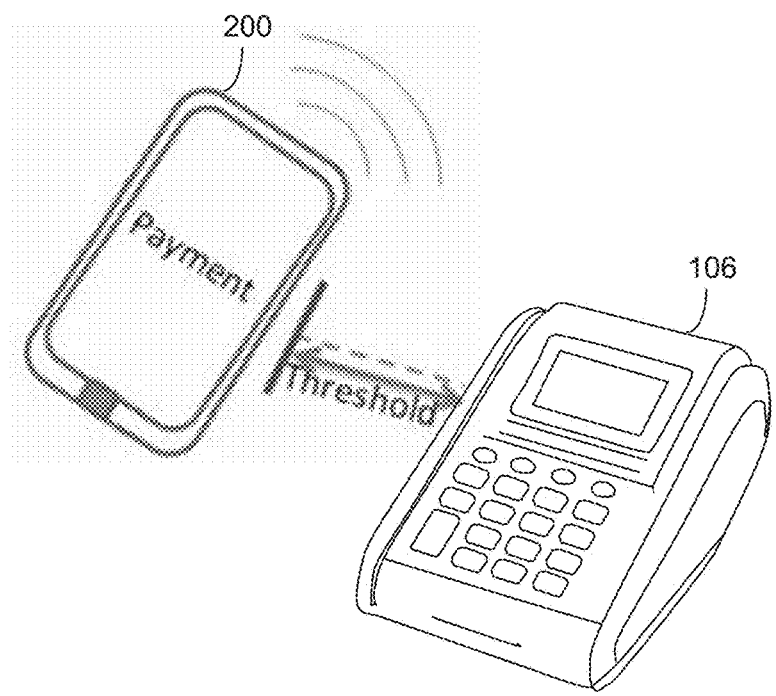

FIGS. 3A and 3B illustrate an example of information transmission based on distance between devices according to various embodiments of the present disclosure. In these illustrative examples, the mobile device 200 transmits information to the POS device 106 based on a calculated distance between the mobile device 200 and POS device 106. The embodiment of the information transmission illustrated in FIGS. 3A and 3B is for illustration only and does not limit the scope of this disclosure to any particular implementation of information transmission.

Embodiments of the present disclosure recognize that once a user authenticates themselves, e.g., via a personal identification number (PIN) fingerprint or other authentication process, payment transmission can start irrespective of whether user is ready to pay or not and irrespective of proximity of mobile device 200 to the POS device 106. Once transmission starts and if the mobile device 200 is not placed close to the POS device 106 quickly enough, embodiments of the present disclosure recognize that transmission can time out and user may need to restart the transmission to retry payment. Embodiments of the present disclosure recognize and take into consideration that starting the transmission as soon as user authenticates on the mobile device 200 can leads to a bad user experience, especially in cases where a user needs to resume/retry payment because of transmission timeout on the mobile device 200. These exemplary scenarios may result in a user moving the mobile device away from the POS device 106 and then closer to the POS device 106 for payment in order to restart the transmission. In addition, for devices with multiple transmission type capabilities, the mobile device 200 may switch between transmission types (e.g., MST to NFC) as the transmission types may have different ranges, leading to additional delays, timing out, resulting in user confusion, etc. Moreover, with repeated transmissions at unmonitored distances from the POS device 106, embodiments of the present disclosure recognize that the payment information may be vulnerable to interception.

Accordingly, embodiments of the present disclosure provide for transmission of information based on a calculated distance between the mobile device 200 to the intended recipient of the transmitted information. In particular, the mobile device 200 calculates the distance between itself and the POS device 106 as discussed in greater detail below. When the calculated distance is not within a threshold distance from the POS device 106, the mobile device 200 does not transmit the information as illustrated in FIG. 3A. Upon calculating that the mobile device 200 is within the threshold distance from the POS device 106, the mobile device 200 does transmits the information to the POS device 106 as illustrated in FIG. 3B.

Embodiments described herein also reduce or negate the risk of transmission being captured by malicious entity when the transmission is started when mobile device 200 is too far away from the POS device 106. Embodiments described herein initiate transmission when the mobile device 200 is within threshold distance to the POS device 106 may also reduce battery power consumption by reducing or preventing unneeded transmissions and processing.

In various embodiments, it is important to know the proximity of the mobile device 200 with a payment service to the POS device 106 for one or more reasons. One reason for knowing the proximity may be to determine when to start transmission (e.g., only begin if POS device is near to receive the transmission). Another reason for knowing the proximity may be to detect an NFC field of the POS device and choose between transmission type (e.g., NFC, MST, etc.) before starting transmission. Yet another reason may be to make sure the mobile device 200 is in close proximity to POS before transmitting payment card information to avoid transmission being received by a malicious reader leading to theft. Another reason for knowing the proximity may be to avoid transmission timeout by setting transmission only when detecting proximity to the POS device to avoid the need to restart or retry the transmission. Still another reason for knowing the proximity may be to optimize or improve battery and CPU usage by starting transmission only on detecting proximity to the POS device.

The switch between transmission types can be avoided with the embodiments described herein as a particular transmission type to be used can be finalized much before transmission. The mobile device 200 may use a mobile payment service to determine the transmission type (e.g., MST or NFC) to be used. For example, the mobile device 200 may determine whether the POS device 106 supports MST or NFC using an electromagnetic interference (EMI) sensor to detect the electromagnetic field proximate to the POS device 106.

The mobile device 200 begins the determined transmission type when in the threshold distance to the POS device 106. For example, a mobile payment transaction according to embodiments of the present disclosure may begin with a user selecting an enrolled card on the mobile device 200 and authenticating payment with a fingerprint, PIN, or other method of authentication (e.g., passcode, voice, biometric, etc.). The mobile payment transaction can conclude with the mobile device 200 initiating the transmission when in the threshold distance to the POS device 106.

Additionally, the mobile device 200 may utilize augmented reality (AR) using one or more of the camera(s) 266 to recognize an object of interest and add useful information about the recognized object on the display 255. In an embodiment for an application to mobile payment support, an object of interest can be the POS device 106 that reads the payment card transmission. The mobile device 200 may utilize AR to recognize a type of the POS device 106 and utilize information about the recognized type of the POS device 106 to make informed decisions, for example, a location on the where the POS device 106 where the information is transmitted to more accurately determine transmission distance, a type of transmission to use (e.g., MST or NFC), etc. The information provided by AR when combined with information from mobile motion sensor(s) 267 used to determine and repeatedly calculate the proximity of mobile device 200 with respect to the POS device 106. In one embodiment, the distance between the mobile device and an object of interest can be measured by combining information from the augmented reality application running on the device along with measurements from the motion sensor(s) 267, such as an accelerometer and gyroscope.

In some embodiments, the threshold distance may not be fixed. Different threshold distances may be used and dynamically determined based on criteria including the type of POS device 106, whether the transmission type is MST or NFC, user history of success for information transmissions with the mobile device 200 or past interactions between the mobile device 200 and a particular type of POS device 106, and combinations thereof.

In these embodiments, various techniques may be utilized for measuring distance of mobile device 200 from a particular object of interest. These techniques can be leveraged to benefit embodiments directed to a mobile payment service. Several of the sensor(s) 265 of the mobile device 200 can aid in measuring the distance of mobile device 200 from the POS device. Accelerometer input when combined with the AR recognition data of POS devices can be used to measure the distance as accurately as possible.

While several of the embodiments depict and discuss mobile payments, other applicable embodiments can include applications where the mobile device 200 transmits any type of information using short range communication protocols including to transfer magnetic data to a magnetic data reader device. Examples can include, locking/unlocking door locks, providing information to identification card readers; transit access (e.g., gates), gaming machines, etc.

Figure 4:
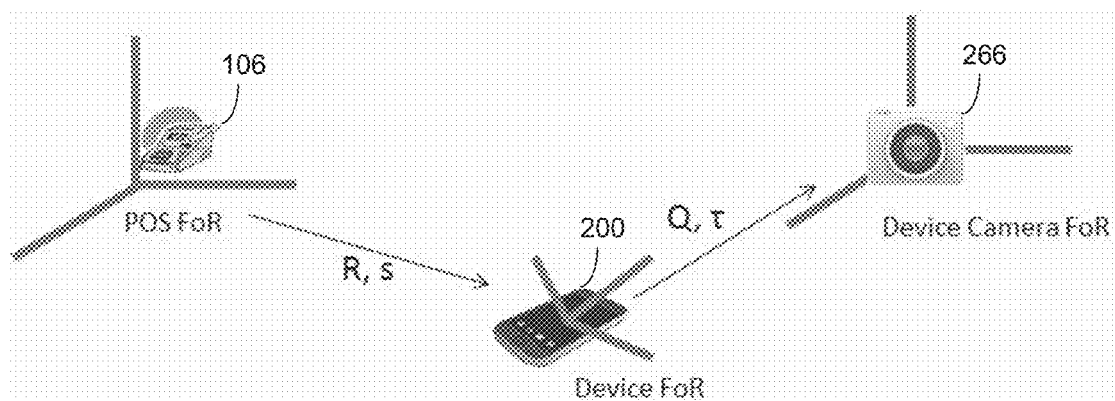
FIG. 4 illustrates an example of calculating a distance between devices according to various embodiments of the present disclosure.

FIG. 4 illustrates an example of calculating the distance between devices according to various embodiments of the present disclosure. The embodiment of calculating the distance between devices illustrated in FIGS. FIG. 4 is for illustration only and does not limit the scope of this disclosure to any particular implementation of distance calculation.

In an embodiment, the mobile device 200 may track the mobile device's pose and orientation with respect to the POS device using continuous distance and orientation calculations. In addition, the mobile device 200 may use an AR application to display the output of one of the camera(s) 266 (e.g., a camera on the back of the mobile device 200) and overlay guidance for positioning the mobile device 200 with respect to the POS device 106 for successful information transmission.

For distance and orientation calculations, the mobile device 200 may use inputs from one of the camera(s) 266 (e.g., a camera on the back of the mobile device 200) to match and track the size visual features detected on the POS device 106 as the mobile device 200 is moved towards or away from the POS device 106. In another example, the mobile device 200 may use inputs from one of the camera(s) 266 (e.g., a camera on the front of the mobile device 200) to match and track the size visual features in the background as the mobile device 200 is moved towards or away from the POS device 106. The mobile device's pose and orientation can be specified by a rotation matrix 'R' and a translation vector 's' between the POS device's coordinate frame of reference (FOR) and the mobile device's coordinate FOR. For example, the mobile device 200 may calculate its pose and orientation with respect to the POS device 106 using images captured by one of the camera(s) 266. The mobile device 200 may calculate its pose and orientation in the environment (e.g., with respect to gravity) using one or more of the motion sensor(s) 267.

When visual tracking is working, the distance between any point on the POS device and the mobile device can be calculated using 's'. Visual tracking may fail when once the mobile device 200 comes too close to the POS device 106 such that the camera(s) 266 are too close to the POS device 106 to produce a focused image (e.g., within 25 cm), or when the POS device 106 is out of the view of the camera(s) 266. This may occur, for example, where the user decides or an AR application may instruct the user to align the mobile device 200 in a position perpendicular to the plane on which the POS device 106 is resting. Once visual tracking fails, the mobile device 200 can use the motion sensor(s) 267 to track the mobile device's pose and orientation for the remainder of the time during the payment transaction.

In one embodiment, the mobile device 200 tracks its pose and orientation using the motion sensor(s) 267 as follows. The mobile device's state at time t may be represented as {t, s(t), R(t), v(t)}, which correspond to the 3D position, orientation, and velocity of the point on the mobile device 200 (e.g., a center of the mobile device 200) in a coordinate system fixed to the FOR of the POS device 106. In this example, s and R are tracked and can also be viewed as the transformation between the POS FOR and the mobile device FOR.

During a first phase when visual tracking is working, the mobile device 200 uses the pose and orientation of the mobile device's camera 266 in the POS coordinate system. These can be converted to the coordinate system fixed to the center of the phone by subtracting a known distance 'T' between the camera and the center of the mobile device 200 and applying any known rotation '$Q^T$' between the camera coordinate frame and the mobile device's coordinate frame. The mobile device's velocity can also be estimated by taking successive differences between the poses and applying a low pass filter.

During a second phase after the visual tracking fails, the mobile device 200 can continue updating pose, orientation, and velocity estimates using the accelerometer and gyroscope sensors. The initial starting pose, orientation, and velocity may come from the visual tracking phase. The accelerometer reports accelerations due to a force experienced by the device in x, y, z directions in the device coordinate system. Force due to gravity is typically included in the accelerator measurements and is removed in order to get acceleration due to motion. The acceleration value 'a' can then be used to derive changes in pose and velocity of the mobile device 200 in a sufficiently small time period 'dt' using the motion equations:

$$\Delta s = v_o * dt + \frac{1}{2} * a * dt^2;$$

$$\Delta v = a * dt$$

where $v_o$ is the initial velocity. The gyroscope reports instantaneous angular velocity wx, wy, wz of the mobile device 200 and can be used to calculate changes in orientation of the mobile device 200 by integrating over time. These changes in orientation can be represented as rotation matrices which can be multiplied with the initial rotation matrix to continue tracking the rotation matrix 'R'.

Optionally, additional conditions may be utilized to trigger a transmission beyond distance. Such conditions may include (a) the mobile device's orientation is sufficiently dose to an optimal orientation that was suggested by the AR application and (b) the mobile device 200 is reasonably stationary as measured by low values of magnitudes of acceleration and angular velocity.

In an embodiment, the mobile device 200 may perform additional tracking actions for between the first and second phases. Just before the visual tracking fails, the pose and orientation values reported by the AR application may be quite erroneous. This can occur because the number and quality of tracked features falls sharply just before the tracking loss and can lead to large errors. Simply utilizing the last available pose, velocity, and orientation estimates from the first phase to start the second phase can result in larger calculation errors.

One additional step to overcome the problem above can be visual tracking by empirically calculating how many bad estimates (e.g., in terms of number of video frames) are shown just before the visual tracking fails (denoted as 'k') and always keep the last (k+1) values of a state vector (covering pose, orientation, velocity). Then after visual tracking failure, the mobile device 200 discards the last k values, and use the (k+1)th value as the starting estimate for the second phase. As long as the bad estimates are limited to a few frames (e.g., 150 ms) and the assumption that the mobile device 200 would not have moved much during that time, such a step can be reasonably accurate.

Alternatively, sensor prediction may be used where even in the first phase, after determining the state estimate for time t, performing a prediction of the estimate for time (t+1) using the accelerometer and gyroscope as to be done in the second phase. If the estimate at time (t+1) is very different from the prediction, the mobile device 200 starts to increase an "outlier_received" count (e.g., a count of outlier or possibly inaccurate frames). If the same situation happens for few consecutive frames, the mobile device 200 discards the outlier frames and continues using the predictions based on the sensors 267, for example, in a sense, the mobile device starts the second phase early. In some embodiments, the mobile device 200 combines the sensor prediction and visual tracking estimates together using a Kalman filter in order to get a more accurate state estimate rather than using one or the other.

By recognizing the POS device 106 and measuring the distance of mobile device 200 from the POS device 106, the payment transmission can be started only when user has moved the mobile device 200 closer to POS device 106. This helps in starting the transmission only when required instead of starting transmission as soon as user authenticates on the mobile device 200 to pay. This also helps in avoiding switching between transmission types. By knowing that mobile device 200 is close to the POS device 106, payment transmission can be received by POS device 106 and avoided from being captured by a malicious entity.

While various embodiments discuss using cameras and motion sensors for distance calculation, any suitable distance calculation technique may be utilized. In one example, the mobile device 200 or the POS device 106 transmit signals with a known or fixed signal strength. The recipient of the transmitted signal can determine the distance based on the strength of the received signal using a metric, such as, a received signal strength indicator (RSSI), for example. In other embodiments, the POS device 106 may determine the distance using one or more of the above-discussed distance calculation techniques and signal the mobile device 200 when to initiate the information transmission.

Figure 5:
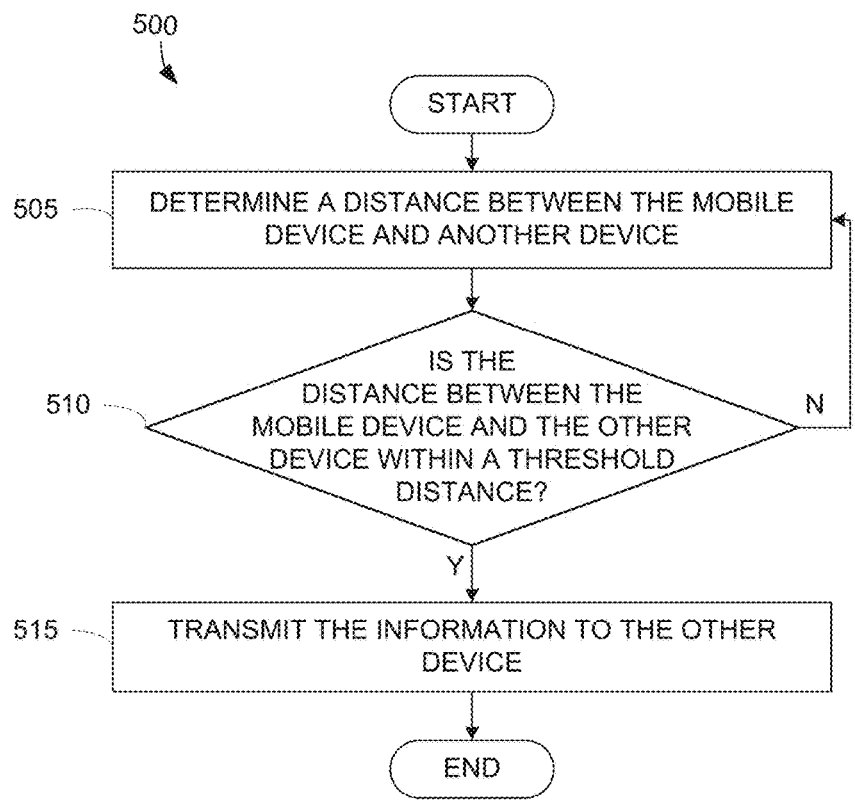
FIG. 5 illustrates a process for transmitting information according to various embodiments of the present disclosure.

FIG. 5 illustrates a process 500 for transmitting information in accordance with various embodiments of the present disclosure. For example, the process 500 depicted in FIG. 5 may be performed by the mobile device 200 in FIG. 2.

The process 500 begins with the mobile device 200 determining a distance between the mobile device 200 and another device (step 505). For example, in step 505, the mobile device 200 may determine the distance as an initial distance in response to a request for the mobile 200 device to transmit the information. In one embodiment, the other device is a POS terminal and the information is payment information for a payment transaction.

As part of this step, the mobile device 200 may calculate the distance between the mobile device 200 and the other device based on one or more images captured by a camera 266 of the mobile device 200 for a first period of time and calculate the distance between the mobile device 200 and the other device using one or more motion sensors 267 of the mobile device 200 for a second period of time after the first period of time when the camera is too close to the other device such that the one or more images captured by the camera of the mobile device 200 are out of focus. Also as part of this step, the mobile device 200 may track a pose and orientation of the mobile device 200 with respect to the other device based on a FOR of the mobile device 200.

In some embodiments, the mobile device 200 may identify a device type of the other device based on one or more images captured by a camera of the mobile device 200, for example, using optical recognition and/or by communicating with a server 104 to identify the device type. The mobile device 200 may identify a reception location on the other device based on the identified device type and calculate this distance as the distance between the mobile device 200 and the reception location on the other device.

The mobile device 200 then determines whether the distance between the mobile device 200 and the other device is within a threshold distance (step 510). If in step 510, the mobile device 200 determines that distance is not within the threshold distance, the mobile device 200 returns to step 505 to continue to determine the distance and continuously calculate the distance, orientation, and/or pose of the mobile device 200 using one or more of the calculation techniques discussed above.

If the mobile device 200 determines that the distance between the mobile device and the other device is within the threshold distance, the mobile device 200 transmits the information to the other device (step 515). For example, in step 515, the mobile device may transmit the information using at least one of NFC and MST.

Figure 6:
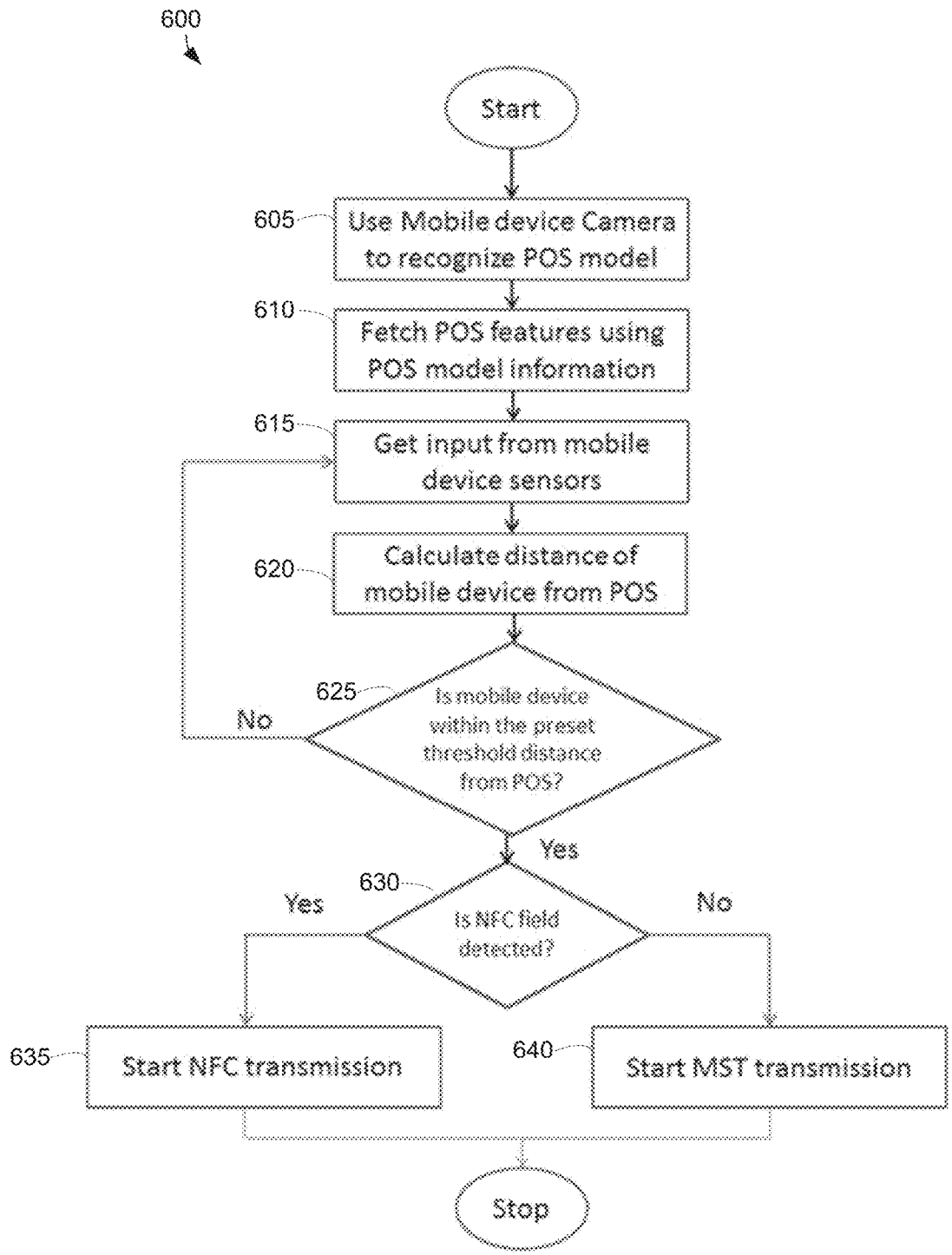
FIG. 6 illustrates a process for payment information transmission according to various embodiments of the present disclosure.

FIG. 6 illustrates a process for payment information transmission in accordance with various embodiments of the present disclosure. For example, the process depicted in FIG. 5 may be performed by the mobile device 200 in FIG. 2. The process 600 is an example of one implementation of the process 500 for a payment information transmission embodiment.

The process 600 begins with the mobile device 200 using the camera to recognize a POS model of the POS device 106 (step 605). The mobile device 200 fetches POS features using the POS model information (e.g., from a payment application on the mobile device 200 or a server 104) (step 610). Thereafter, the mobile device 200 receives inputs from one or more of its sensor(s) 265 (e.g., camera(s) 266 and motion sensor(s) 267) (step 615). The mobile device 200 then calculates the distance between the mobile device 200 and the POS device 106 (step 620), for example, using one or more of the calculation techniques discussed above.

Thereafter, the mobile device 200 determines whether the mobile device 200 is within the preset threshold distance from the POS device 106 (step 625). If in step 625, the mobile device 200 determines that distance is not within the preset threshold distance, the mobile device 200 returns to steps 615 and 620 to continue receive sensor inputs and continuously calculate the distance of the mobile device 200 from the POS device 106.

If the mobile device 200 determines that the distance between the mobile device 200 and the other device is within the threshold distance, the mobile device 200 determines whether an NFC field is detected in the proximity of the POS device 106 (step 630). If the NFC field is detected, the mobile device 200 determines to use NFC and starts an NFC transmission (step 635). If the NFC field is not detected, the mobile device 200 determines to use MST and starts a MST transmission (step 640).

Although FIGS. 5 and 6 illustrate examples of processes for transmitting information and payment information transmission, respectively, various changes could be made to FIGS. 5 and 6. For example, while shown as a series of steps, various steps in each figure could overlap, occur in parallel, occur in a different order, occur multiple times, or be omitted in some embodiments.

Embodiments of the present disclosure provide for transmission of information based on a calculated distance between the mobile device and the intended recipient of the transmitted information. Embodiments of the present disclosure avoid transmission timeout by setting transmission only when detecting proximity to the recipient device to avoid the need to restart or retry the transmission. Embodiments described herein reduce or negate the risk of transmission being captured by malicious entity when the transmission is started when mobile device is too far away from the recipient device. Embodiments described herein may also reduce battery power consumption by reducing unneeded transmissions and unneeded processing.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method of transmitting information, the method comprising:
    capturing, by a camera of a mobile device, one or more images for a first period of time;
    determining, by the mobile device, a distance between the mobile device and another device in response to a request for the mobile device to transmit the information, wherein determining the distance comprises calculating, by the mobile device, the distance between the mobile device and the other device based on the one or more images;
    determining, by the mobile device, whether the distance between the mobile device and the other device is within a threshold distance; and
    transmitting, by the mobile device, the information to the other device after determining that the distance between the mobile device and the other device is within the threshold distance.

2. The method of claim 1, further comprising calculating, by the mobile device, the distance between the mobile device and the other device using one or more sensors of the mobile device for a second period of time after the first period of time when the camera is too close to the other device for the mobile device to accurately calculate the distance using the camera.

3. The method of claim 1, wherein determining the distance between the mobile device and the other device further comprises:
    determining an initial distance between the mobile device and the other device based on the one or more images captured by the camera of the mobile device; and calculating, by the mobile device, the distance between the mobile device and the other device using one or more sensors of the mobile device.

4. The method of claim 1, wherein determining the distance between the mobile device and the other device comprises tracking an orientation of the mobile device with respect to the other device based on a frame of reference of the mobile device.

5. The method of claim 1, further comprising:
identifying, by the mobile device, a device type of the other device based on one or more images captured by the camera of the mobile device; and
identifying, by the mobile device, a reception location on the other device based on the device type.

6. The method of claim 5, wherein determining the distance between the mobile device and the other device comprises calculating the distance between the mobile device and the reception location on the other device.

7. The method of claim 1, wherein:
the other device is a point of sale terminal,
the information is payment information for a payment transaction, and
transmitting the information comprises transmitting the information using at least one of near field communication (NFC) and a magnetic secure transmission (MST).

8. A mobile device for transmitting information, the mobile device comprising:
a camera configured to capture one or more images for a first period of time;
at least one processor configured to:
determine a distance between the mobile device and another device in response to a request for the mobile device to transmit the information, wherein to determine the distance, the at least one processor is further configured to calculate the distance between the mobile device and the other device based on the one or more images, and
determine whether the distance between the mobile device and the other device is within a threshold distance; and
a transceiver operably connected to the at least one processor, the transceiver configured to transmit the information to the other device after determining that the distance between the mobile device and the other device is within the threshold distance.

9. The mobile device of claim 8, further comprising:
one or more sensors, wherein the at least one processor is further configured to calculate the distance between the mobile device and the other device using the one or more sensors of the mobile device for a second period of time after the first period of time when the camera is too close to the other device for the mobile device to accurately calculate the distance using the camera.

10. The mobile device of claim 8, further comprising:
one or more sensors operably connected to the at least one processor;
wherein to determine the distance between the mobile device and the other device, the at least one processor is further configured to:

determine an initial distance between the mobile device and the other device based on the one or more images captured by the camera of the mobile device; and
calculate the distance between the mobile device and the other device using the one or more sensors of the mobile device.

11. The mobile device of claim 8, wherein to determine the distance between the mobile device and the other device, the at least one processor is further configured to track an orientation of the mobile device with respect to the other device based on a frame of reference of the mobile device.

12. The mobile device of claim 8, further comprising:
wherein the at least one processor is further configured to:
identify a device type of the other device based on one or more images captured by the camera of the mobile device; and
identify a reception location on the other device based on the device type.

13. The mobile device of claim 12, wherein to determine the distance between the mobile device and the other device, the at least one processor is further configured to calculate the distance between the mobile device and the reception location on the other device.

14. The mobile device of claim 8, wherein:
the other device is a point of sale terminal,
the information is payment information for a payment transaction, and
the transceiver is configured to transmit the information using at least one of a near field communication (NFC) and a magnetic secure transmission (MST).

15. A non-transitory computer readable medium comprising a plurality of instructions that, when executed by at least one processor of a mobile device, causes the at least one processor to:
capture, by a camera of the mobile device, one or more images for a first period of time;
determine a distance between the mobile device and another device in response to a request for the mobile device to transmit information, by calculating the distance between the mobile device and the other device based on the one or more images;
determine whether the distance between the mobile device and the other device is within a threshold distance; and
instruct transmission of information to the other device after determining that the distance between the mobile device and the other device is within the threshold distance.

16. The non-transitory computer readable medium of claim 15, wherein the plurality of instructions is further configured to cause the at least one processor to calculate the distance between the mobile device and the other device using one or more sensors of the mobile device for a second period of time after the first period of time when the camera is too close to the other device for the mobile device to accurately calculate the distance using the camera.

17. The non-transitory computer readable medium of claim 15, wherein the plurality of instructions is further configured to cause the at least one processor to track an orientation of the mobile device with respect to the other device based on a frame of reference of the mobile device.

* * * * *